United States Patent [19]

Tukala

[11] Patent Number: 5,340,246
[45] Date of Patent: Aug. 23, 1994

[54] INDEXABLE INSERT DRILL AND AN INSERT WITH A SYMMETRICAL DRILL POINT AND CUTTING EDGES OF DIFFERENT LENGTHS

[75] Inventor: Tommy Tukala, Sandviken, Sweden
[73] Assignee: Sandvik AB, Sandviken, Sweden
[21] Appl. No.: 94,156
[22] PCT Filed: Jan. 13, 1992
[86] PCT No.: PCT/SE92/00013
    § 371 Date: Sep. 10, 1993
    § 102(e) Date: Sep. 10, 1993
[87] PCT Pub. No.: WO92/12817
    PCT Pub. Date: Aug. 6, 1992

[30] Foreign Application Priority Data

Jan. 28, 1991 [SE] Sweden ............................ 9100246

[51] Int. Cl.⁵ ............................................ B23B 51/02
[52] U.S. Cl. .................................. 408/233; 408/231; 408/713; 408/224
[58] Field of Search .............. 408/223, 224, 227, 233, 408/713, 230

[56] References Cited

U.S. PATENT DOCUMENTS

| | | | |
|---|---|---|---|
| 2,576,664 | 11/1951 | Berlien | 77/70 |
| 4,293,252 | 10/1981 | Kress et al. | 408/224 |
| 4,563,113 | 1/1986 | Ebenhoch | 408/223 |
| 4,844,669 | 7/1989 | Tsujimura et al. | 408/188 |

FOREIGN PATENT DOCUMENTS 3306209 2/1985 Fed. Rep. of Germany.
3803188 11/1988 Fed. Rep. of Germany.

Primary Examiner—Steven C. Bishop
Attorney, Agent, or Firm—Burns, Doane, Swecker & Mathis

[57] ABSTRACT

A drill with indexable inserts has one center insert (11) and one peripheral insert (12), said center insert having a symmetric drill point (25) on the drill axis (10) with a transverse edge which is continuous with one short edge (27) and one long edge (21,23) and a screw hole offset from the symmetry axis of the drill point (25) towards the side of the long edge (21,23).

10 Claims, 1 Drawing Sheet

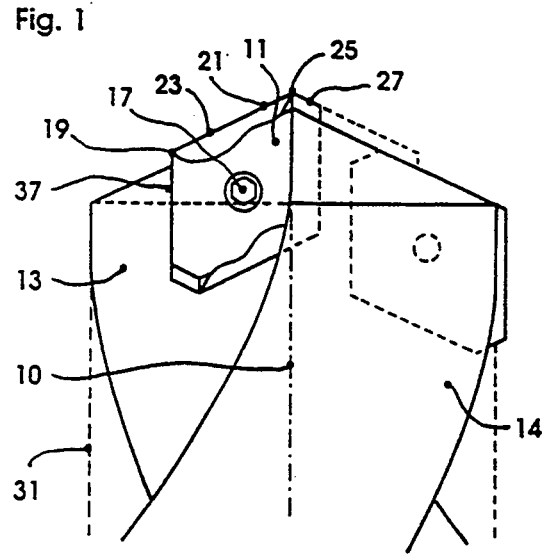
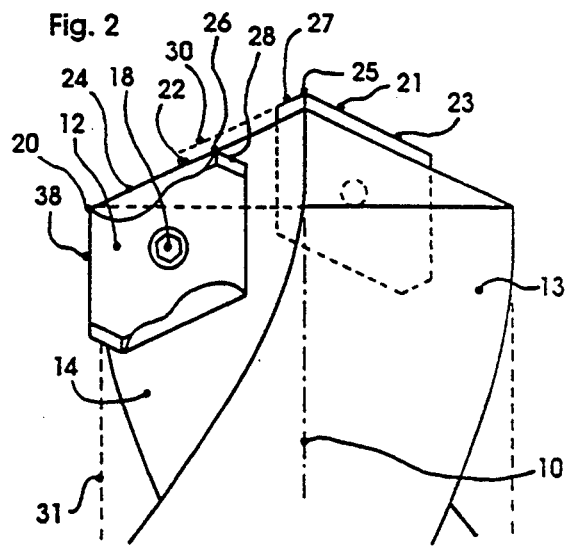
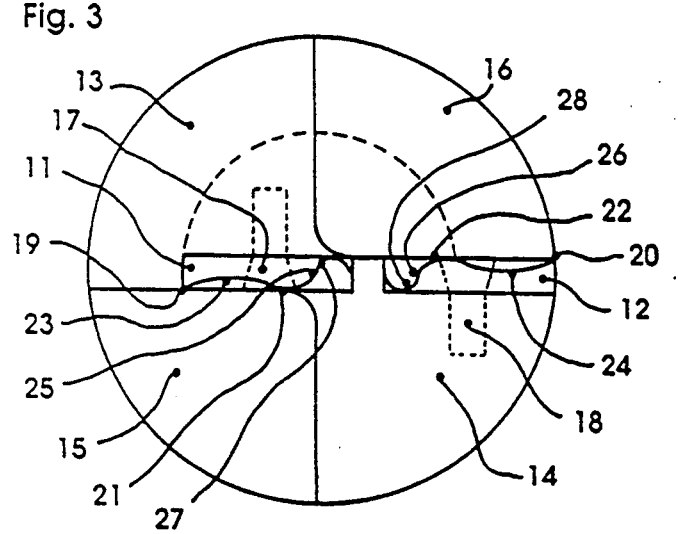
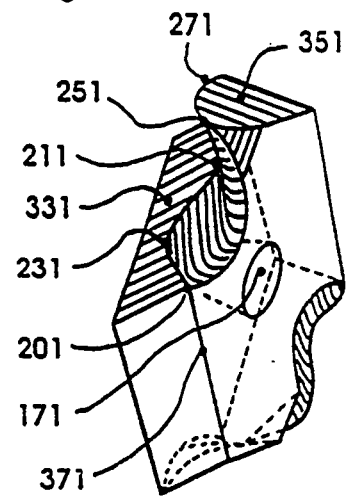
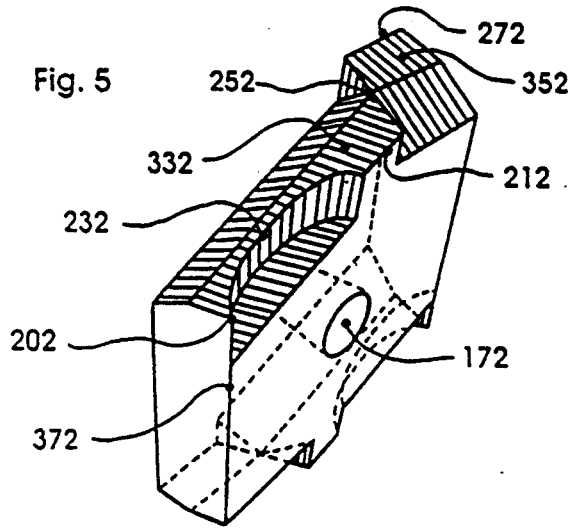
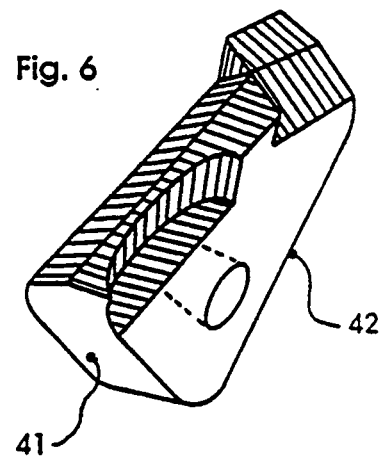

5,340,246

INDEXABLE INSERT DRILL AND AN INSERT WITH A SYMMETRICAL DRILL POINT AND CUTTING EDGES OF DIFFERENT LENGTHS

BACKGROUND OF THE INVENTION

It is previously known to make drills for metal drilling with two indexable inserts of tungsten carbide, where the first insert is a center insert which will cut the central parts of the hole, and the second insert is a peripheral insert which will cut the peripheral parts of the hole. The inserts are substantially located each on one side of the axis of the drill, but a portion of the center insert will often extend past the axis. Some such drills are described in the patents EP 088 505, EP 181 844, EP 292 455, U.S. Pat. No. 4,124,328 and U.S. Pat. No. 4,268,198. Compared to drills with a continuous insert over the whole diameter of the drill, such as U.S. Pat. No. 4,527,931, drills with center and peripheral inserts have the advantage of cutting narrower chips which are more easily conveyed out of the hole, but the disadvantage of large unbalanced lateral cutting forces, tending to bend the drill or displace the work piece resulting in impaired precision. For this reason, drills with center and peripheral inserts have up to now been used for short holes only, and require rigid clamping of the work piece. Since the forward extremity of the center insert is not on the axis of the drill, it has no tendency to center itself on an existing hole of smaller diameter and is not suitable for chamfering.

This is especially disturbing in starting a new hole when the drill is not yet stabilized by the outer edge of the peripheral insert. Unbalanced forces in the plane of the edges will bend the drill to give the hole an incorrect diameter, and forces at right angles to the inserts will make it difficult to start a hole at the point intended, especially on work pieces with small thickness. Unbalanced lateral forces will occur either because the length of actively cutting edge on one side of the drill axis is not equal to that on the other side, or because the axis does not lie in the planes of the edges. The unbalanced forces will be particularly severe if the surface of the work piece is uneven or is not at right angles to the drill axis.

SUMMARY

The invention concerns a drill with center and peripheral inserts, the edges of which have been shaped to balance the forces completely at the start of a hole, and later at least to keep lateral forces in the plane of the edges as small as possible. This makes it possible to use this insert arrangement for long holes and deep holes. Drills according to the invention are as easy to use as symmetrical twist drills, and they do not require as much rigidity in the machine and in the clamping as do other drills with two inserts.

According to the invention, the center insert is made with a centering drill point, preferrably with a cutting cross edge, such as split-point, relief ground or according to U.S. Pat. No. 4,222,690. These drill point designs need small feed forces and will center the drill efficiently. On one side of the drill point the cross edge is continuous with a long edge and on the other side with a short edge The long edge should be longer than 25% of the hole diameter, the short edge should be shorter than 25% of the hole diameter. At the beginning of a hole there are no lateral forces until the actively cutting part of the long edge is longer than the short edge.

The long edge lies in the conical surface cut by the center insert, but is made concave by a tangential recess in its middle part. In this way, the outer portions of the long edge get a small positive radial rake angle resulting in very small total radial forces. At its end the long edge joins the lateral edge with a short arcuate transition.

The peripheral insert shall have at least one long edge, longer than 25% of the hole diameter. It can be made with a straight cutting edge, and in such a case it is located with the drill axis in the plane of the edge. It can also be an insert of the same type as the center insert, and located in the same plane as the latter. In both cases the peripheral insert is preferrably retracted axially so far that the inner part of its edge moves freely in an area which has already been machined by the center insert. This is especially desirable in case the peripheral insert is similar to the center insert with a drill point and a short edge on the other side.

The body of the drill is made with two spiral flutes for conveying the chips, the first flute for the chips machined by the long edge of the center insert and the second flute for chips machined by the short edge of the center insert and by the long edge of the peripheral insert. Between the flutes the body forms two flanges connected by a web at the drill axis.

The peripheral insert rests with its whole back side against the first flange. The center insert rests with the major part of its back side against the second flange. The minor part of the center insert comprising the short edge extends past the drill axis through a slot cut in the web with a width slightly larger than the thickness of the insert. When the peripheral insert is actively cutting, its cutting force exerts a torque on the anterior part of the flange it is attached to, twisting the flange to close the slot about the center insert, which is then supported over its whole width including behind the short edge.

Each insert can have one or two sets of cutting edges. The beveled hole for the clamping screw is in either case offset from the drill axis towards the side of the long edge, and does not lie on the drill point axis or the bisector of the edges which corresponds to the drill axis when mounted as center insert. This allows the screw to be fastened in the solid material of the flange without restricting the available space for the flutes.

BRIEF DESCRIPTION OF THE DRAWINGS

FIG. 1 is a view of a drill according to the present invention showing the cutting end of the drill viewed from a side of a center insert;

FIG. 2 is a view of the drill of FIG. 1 showing the cutting end of the drill viewed from a side of a peripheral insert;

FIG. 3 is a view of the drill of FIG. 1 showing the cutting end of the drill viewed axially;

FIG. 4 is a view of a center insert according to the present invention;

FIG. 5 is a view of a second embodiment of a drill insert according to the present invention; and FIG. 6 is a view of a third embodiment of a drill insert according to the present invention.

DESCRIPTION OF THE PREFERRED EMBODIMENTS

The location of the inserts is depicted in FIGS. 1-3, showing the cutting end of the drill viewed from the side of the center insert, from the side of the peripheral insert and axially. The drill has a center insert (11) and a peripheral insert (12). The drill axis (10) passes through the center insert (11) which is provided with a centering drill point (25) symmetric around the drill axis (10). The transverse edge of the drill point is continued on one side of the axis by a short edge (27), on the other side by a long edge, the inner part (21) of which is substantially symmetric to the short edge (27) and the outer part (23) of which is curved in its plane of motion to let a tangent line from some points along it intersect or pass behind the drill axis (10).

The peripheral insert (12) has a long edge, the outer part (24) of which extends somewhat further out than the cylindrical surface of the drill body, ensuring that the hole wall (31) is cut by the end (20) of the edge. To give the edge ample strength the end (20) is made with an arcuate transition merging into the lateral edge (38). The peripheral insert (12) can be shaped as the center insert (11) with a centering drill point (26) and a short edge (28) symmetrical to the inner part (22) of the long edge. In such a case the peripheral insert (12) should be axially retracted so far, that its short edge (28) and drill point (26) do not touch the bottom of the hole, but move within the space (30) already machined by the center insert (11). The end (19) of the long edge (23) of the center insert should preferrably have an arcuate transition to the lateral edge (37) and the long edges should overlap in the radial direction, which means that if the two inserts (11,12) have identical shape, the long edge (21,23) of the center insert and the long edge (22,24) of the peripheral insert should each be longer than 25% of the hole diameter.

The body of the drill has two spiral flutes to convey the chips, where the first flute (15) conveys chips formed by the long edge (21,23) of the center insert (11) and the second flute (16) conveys the chips formed by the peripheral insert (12) and the short edge (27) of the center insert. Between the flutes are flanges, where the center insert is clamped to the first flange (13) by a first bevel head screw (17) and the peripheral insert (12) is clamped to the second flange (14) by a second bevel head screw (18). The threaded hole for the first screw (17) is not on the line of symmetry of the drill point (25) coinciding with the drill axis (10), but radially offset corresponding to some point on the long edge (21,23) to let the screw be supported by solid material in the flange even if the second flute (16) is made very deep and spacious. The center insert (11) and the peripheral insert (12) rest in recessed pockets. The pocket for the center insert is partly sideways recessed in the second flange (14) forming a slot from the first flute (15) to the second flute (16).

One embodiment of the center insert (11) according to the invention is shown in FIG. 4. The long edge is curved to an S-shape in the plane of the relief surface (331) with the inner part (211) convex and the outer part (231) concave. A line tangent to the outer part of the edge near its end (201) should pass through or behind the drill point (251). The short edge (271) is convex in the plane of the relief surface (351). Preferrably the short edge (271) and the inner part (211) of the long edge have a curvature increasing towards the drill point (251) similar to U.S. 4,222,690. The rake angle along the edges is positive which is achieved by a groove along the edges of the substantially flat inserts, said groove having a depth to follow the curvature of the edges. The transition from the outer part (231) of the long edge to the lateral edge (371) near the end (201) is arcuate. The insert is reversible around the screw hole (171) by having two sets of cutting edges and parallel lateral edges (372).

A second embodiment is shown in FIG. 5, where the geometry is simplified for lower production cost. The drill point (252) is made with a straight split-point cross edge, made more efficient by making the relief surfaces (332,352) increasingly steeply sloping further behind the cutting edges. The short edge (252) and the inner part (212) of the long edge are straight with a sharp transition to the outer part (232). The insert is reversible around the screw hole (172) and has two sets of cutting edges and parallel lateral edges (372).

When drilling hard brittle materials, abrasive wear of the edges is of little importance, and most edge damage is such that the whole insert must be discarded. It is then preferrable to make the insert with only one set of cutting edges and shape the other edges to allow especially stable and vibration-free clamping, such as with two converging edges (41,42) according to FIG. 6.

The peripheral insert can also be a standard triangular insert. For very large diameters it is also possible to use more than two inserts, where according to the invention one is a center insert and one is a peripheral insert and the remainder are placed at intermediate radial positions, alternating between the flanges (13,14).

A center insert according to the invention can also be used for a single insert drill, but then the advantage of two easily conveyed streams of chips is not achieved, and the unbalanced lateral forces during the later part of the drill operation will be severe.

I claim:

1. Drill with at least two indexable cutting inserts, comprising one center insert and one peripheral insert, wherein the center insert has a drill point on the axis of the drill, said drill point being symmetric with respect to the flat sides of the insert and has a transverse edge with is continuous with one short edge at a side of the insert and one long edge at another side of the insert.

2. Drill according to claim 1, wherein the axis of the drill is symmetrically located between the two flat sides of the insert.

3. Drill according to claim 1, wherein the inner part of the long edge is congruent with the short edge.

4. Drill according to claim 1, wherein the outer part of the long edge is concavely arcuate within the plane of the relief surface as seen from the rake side.

5. Drill according to claim 1, wherein the center insert is clamped to the drill body by a screw, which is radially offset from the axis of the drill towards the side of the long edge.

6. Drill according to claim 1, wherein the peripheral insert is conformable to the center insert.

7. Indexable insert for drills, comprising at least one drill point, said drill point being symmetrically located with respect to two flat sides of the insert and having a transverse edge which is continuous with one short edge at one side of the insert and one long edge at another side of the insert.

8. Indexable insert according to claim 7, wherein the outer part of the long edge is concavely arcuate within the plane of the relief surface as seen from the rake side.

9. Indexable insert according to claim 7, further comprising a hole offset from the symmetry axis of the drill point towards the side of the long edge.

10. Indexable insert according to claim 7, wherein the insert is reversible and has two drill points each having a transverse edge which is continuous with one short edge and one long edge.

* * * * *